Aug. 11, 1931.    A. A. HOLLE    1,818,892
STEERING GEAR FOR MOTOR DRIVEN VEHICLES
Filed Nov. 9, 1927    2 Sheets-Sheet 1

Inventor
Alexander Albert Holle
By D. Singer, Atty.

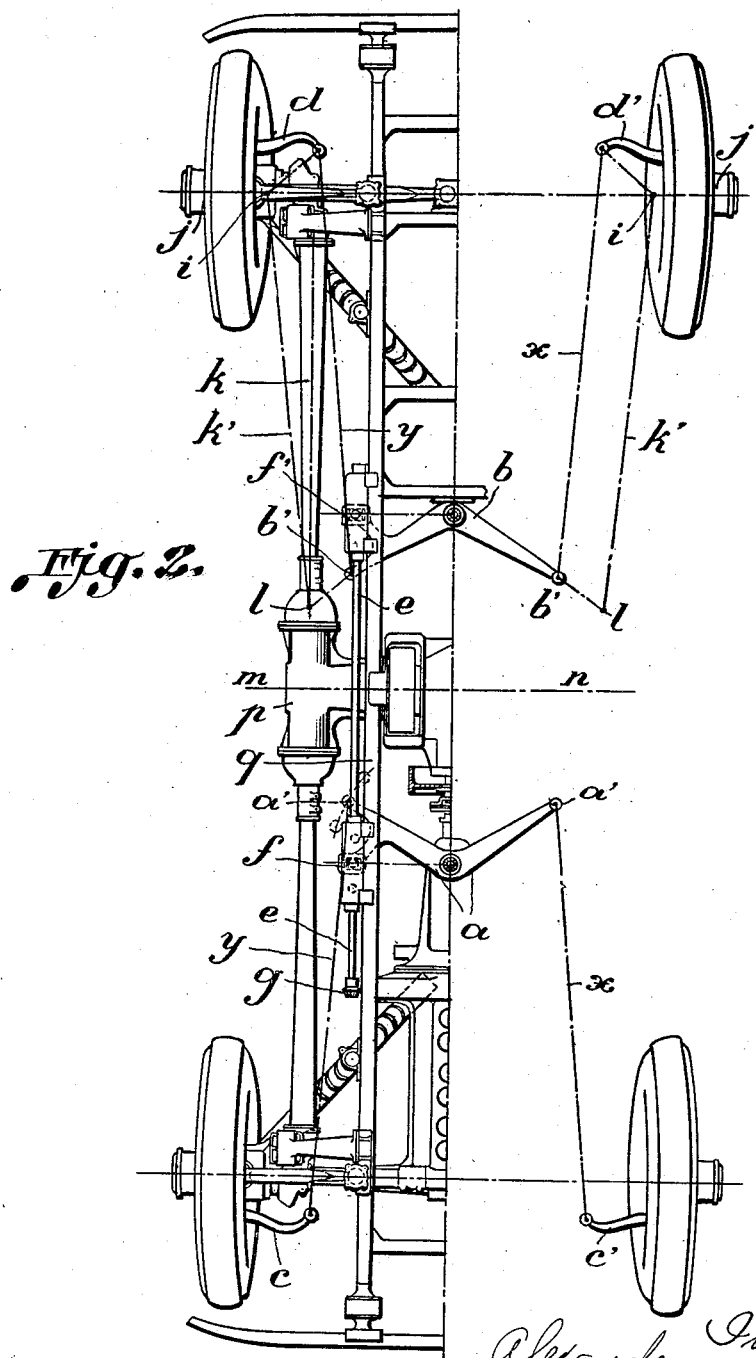

Patented Aug. 11, 1931

1,818,892

UNITED STATES PATENT OFFICE

ALEXANDER ALBERT HOLLE, OF PARIS, FRANCE, ASSIGNOR TO SOCIETE INTERNATIONALE HOLVERTA, SOCIETE ANONYME, OF BRUSSELS, BELGIUM

STEERING GEAR FOR MOTOR DRIVEN VEHICLES

Application filed November 9, 1927, Serial No. 232,171, and in Belgium November 16, 1926.

Application for patent has been made in the following countries: Belgium: 16th November 1926. France: 30th November 1926. Germany: 31st December 1926. Netherlands: 25th January 1927. Great Britain: 13th April 1927.

This invention relates to the steering gear for motor vehicles in which the four wheels are all steering wheels, and more particularly to those in which each wheel is mounted on an independent axle. It has for its object a relatively simple and strong construction in which no reaction is transmitted to the hand wheel, which reaction is generally called "involuntary steering" and is due to the vertical movements of the wheels or to the bending of the suspension springs produced by rough road, and in which the number of articulations is reduced to a minimum, this construction making it possible to obtain moreover a correct and gradually more pronounced steering or turning of the two wheels at the side of the curve than that of the wheels situated at the outside of the curve, and to do this in any positions comprised within the angle of steering or lock provided for the said wheels.

According to the invention, the centre of pivoting or turning of each of the front wheels and of each of the rear wheels which are all steering and independent and can be all driving, is connected to the chassis by means of a connecting rod remaining approximately parallel to the longitudinal axis of the said chassis and articulated laterally to the said chassis by a ball and socket joint.

During the vertical movements of the wheel, the said centre of pivoting describes thus an arc of a circle about a point situated laterally of the chassis and towards the centre of its length, this point being the centre of the ball and socket joint.

The lever of the stub axle of the wheel or steering lever of the said wheel, can thus be actuated by a steering rod which has approximately the same length as the connecting rod and remains approximately parallel to the said connecting rod.

This ensures the elimination of the "involuntary steering", that is to say of the reaction which is transmitted to the steering hand wheel owing to the vertical movements of the wheel due to a rough road.

The invention has for its further object to correct the error of steering or turning of the wheels which occurs in the usual steering systems.

According to the invention, the error of the angular movement, caused by the end of the steering rod on the steering lever of the wheel, is corrected by an equal error in opposite direction, produced at the other end of the said rod by the specially arranged lever which controls it and is pivoted at a point situated on the longitudinal axis of the chassis.

This lever controlling the rod, is preferably made of approximately the same length as that of the steering lever actuated by the said rod, the said levers moving in approximately parallel planes and being themselves approximately parallel when they are in their normal position, but their centres of pivoting are situated at either side of the connecting rod in question.

In the construction thus designed, and assuming that the lever operating the connecting rod has the same length as that operated by the said rod, the points of articulation of the said rod and the points of pivoting of the two levers will form the apices of a deformable parallelogram.

Correct differentiation of steering between the wheel inside and the wheel outside the turning, is now produced as follows:

The two steering rods controlling the steering on turning of the two wheels, are each articulated to one of the equal arms of a bell crank lever or equivalent member which forms an equalizing lever or beam and which bell crank lever pivots centrally about a point situated on the longitudinal axis of the chassis, the said point being normally at a greater distance from the central cross line $m$—$m$ of the chassis than the ends of its two arms. (See Fig. 2.)

Owing to this arrangement of the equalizing lever or beam and for one and the same angular movement of the two arms, the linear movement of one of the rods will be greater than the linear movement of the other rod, that is to say the angle of steering of one of the wheels will be greater in the desired direction than that of the other wheel.

By suitably calculating the length of the arms of the said equalizing lever or beam and that of the steering levers of the wheels, an absolutely correct diagram of steering or turning of the two wheels will be obtained, that is to say the point of intersection of the axes of the two stub axles of the said wheels will move in a line at right angles to the longitudinal axis of the chassis of the vehicle for any positions of steering within limits of practical amplitude.

It is known however that in the diagram of usual steering gears, this point of intersection does not move on a straight line, but on a curve, in such a manner that the diagram is correct only for a few positions.

By suitably choosing the angle which the arms of the equalizing bell crank lever or beam make with each other, it is possible to bring the line of movement of the point of intersection above referred to, either to the central cross line of the chassis of the vehicle, or to a line parallel to the said central cross line, as may be required by the construction.

If now the system of steering with four wheels is examined, it is desirable that the point of intersection of the axes of the stub axles of the front wheels should coincide with that of the axes of the stub axles of the rear wheels.

To that end, the invention provides that the steering rods of the two groups of wheels shall be controlled by two equalizing bell crank levers arranged in opposite directions and moved in opposite directions to one and the same amplitude when it is desired that the two points of intersection above referred to, should coincide and move on the central cross line of the chassis.

If the movement of the said two equalizing levers is of different amplitude, the coinciding points of intersection will move on a line parallel to the said central cross line, but situated in front of, or behind, the latter, according as may be desired.

A construction according to the invention hereinbefore set forth, is shown by way of example in the accompanying drawings in which:—

Figure 2 is a partial view in plan, showing the application of this system to a chassis of a motor vehicle.

Figure 1:
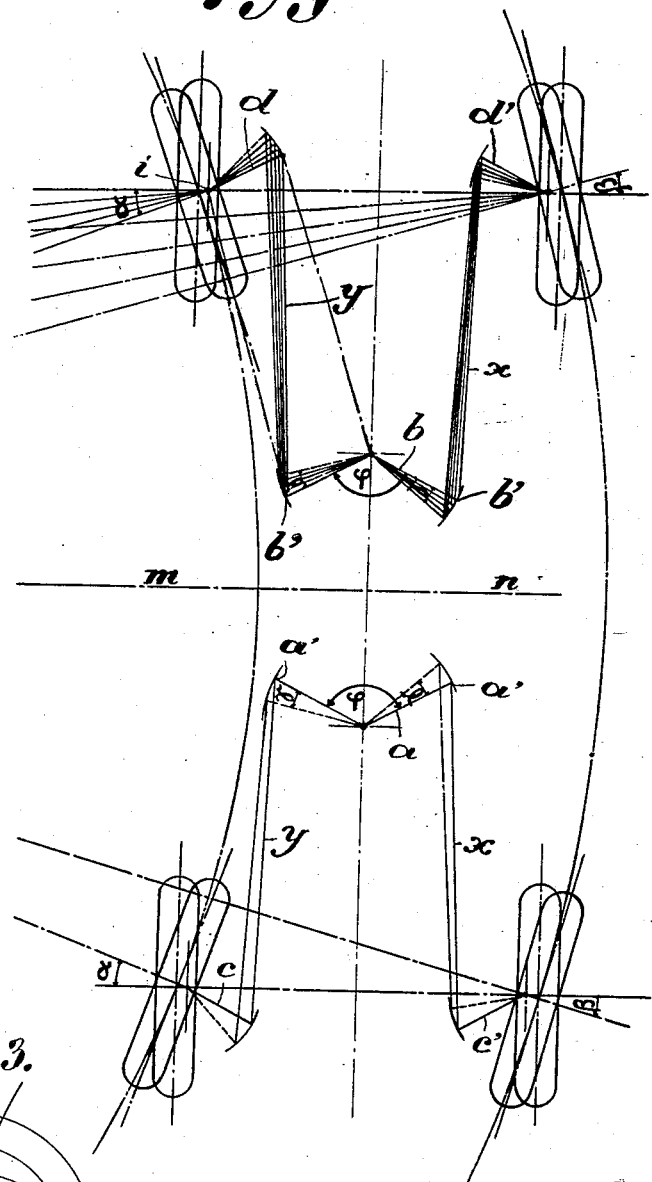
Figure 1 shows diagrammatically in plan the system of steering control of the four steering wheels, according to the invention.

With reference to Figure 1, two bell crank levers $a$ and $b$ forming equalizing levers or beams, are arranged transversely and pivotally mounted on the longitudinal axis of the chassis of the vehicle, at a suitable distance from each other as at $o'$, $o^2$. The ends $a'$ and $b'$ of each of these transverse levers are connected to the steering or turning levers $c$, $c'$ and $d$, $d'$ of the stub axles of the two systems of independent wheels provided at each end of the chassis, by means of steering rods or bars $x$, $x$, $y$, $y$, arranged approximately parallel to the longitudinal axis of the chassis.

Given the relative position of the arms of the lever of the whole of the mechanism, it is obvious, as already stated, that for a certain angular movement $\gamma$ of the transverse bell crank levers forming equalizing levers, it will be possible to produce different angular movements of the levers $c$, $c'$ and $d$, $d'$ in accordance with the angles $\beta$ and $\alpha$ which are required to obtain a correct diagram of the steering. That is to say, the angular movement of the lever controlling the wheel situated on the inside of the curve when turning, will be always greater than that of the lever controlling the corresponding wheel situated outside, the differentiation being variable and such that the axes of the stub axles of the two wheels of a system or group, will always meet on a straight line $m$, $n$ at right angles to the longitudinal axis of the chassis, which condition is necessary for obtaining correct steering straight ahead or turning of these two wheels on a turning.

By suitably choosing the angle $\varphi$ which two two arms of the bell crank lever corresponding to these two wheels, make with each other, the said point of intersection will be caused to move on the central cross line of the chassis.

By making to coincide on the same line the points of intersection of the axes of stub axles for the two systems of wheels, a correct steering control will be ensured for vehicles with four steering wheels as shown in Figure 1.

In the construction of the said system of control of the four steering wheels, such as is shown in Figure 2, there will be found again the bell crank levers $a$ and $b$ and the pivoting or turning levers $c$ and $d$ of the front and rear wheels.

The control of the said equalizing levers $a$ and $b$ is obtained by means of a spindle $e$ arranged longitudinally and provided with left and right hand threads engaging with nuts $f$ and $f'$ with corresponding pitch, which nuts in their turn engage with the adjacent ends of the said equalizing levers.

The movement of rotation is transmitted to the said spindle $e$ by the column or pillar supporting the steering hand wheel not shown, by means of a bevel pinion $g$ or of an equivalent part. As this pinion could be arranged at any desired point of the length of the spindle, it is thus possible to place the steering hand wheel at any suitable point of the length of the chassis, and even to provide double steering control if desired.

In order to make possible the relative longitudinal movement between each nut and the cross lever which carries it, which movement is due to the radial movement of the end of each lever, the said nuts are built and arranged so as to slide in slots provided in the ends of the levers or in shoulders provided on the said levers.

It is obvious that the control of the said cross levers could be obtained by any other suitable means, provided that it transmits to them equal and reverse movements.

Figure 3:
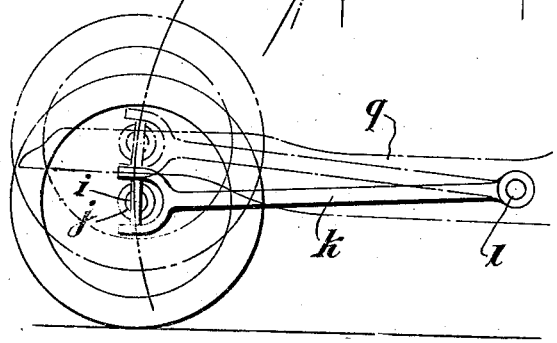
Figure 3 shows diagrammatically in elevation the vertical movements of the centre of pivoting of one of the wheels.

As will be seen in Figures 2 and 3, the pivot pin $i$ of the stub axle $j$ of each wheel is mounted at the end of a connecting rod $k$, the other end of which is connected by a ball and socket joint $l$ to a lateral projection $p$ of the chassis $q$.

During the vertical movements of the wheel, the centre of pivoting of the latter describes thus an arc of a circle having for its centre the centre of the joint $l$, and for its radius the theoretical connecting rod $k'$ which connects the pivot pin of the stub axle to the chassis $q$.

The lever $d'$ of the stub axle of the wheel can thus be operated by means of a connecting rod $x$ having approximately the same length as the theoretical connecting rod $k'$ and remaining approximately parallel to the said connecting rod.

It will be readily understood by examining for instance the parallelogram having for its sides $x$, $k'$, $b'$, $l$ and $d'$ (Figure 2) that the lever $d'$ will be practically unable to react on the rod $x$ or on the lever $b'$ which controls the said rod, or on the steering hand wheel not shown which controls the said lever, during vertical movements of the wheel or during the bending of the suspension spring, the slight reactions that may be produced by such movements, being absorbed without any other injurious effect, by the elastic ball and socket joints of the said rod $x$.

Having now particularly described and ascertained the nature of my said invention and in what manner the same is to be performed, I declare that what I claim is:—

1. A steering mechanism for automobile vehicles, comprising four independent and steering wheels, a double armed lever for each pair of wheels, pivoted at the center at a point on the longitudinal axis of the chassis, a tubular push or pull rod for each wheel enclosing the transmission shaft and disposed approximately parallel to the chassis, connected with the wheel arm and also connected to the chassis, a steering rod articulated on the one hand to the steering lever of the wheel and on the other hand to an arm of one of said double armed levers, the said steering rod being of the same length as the tubular push rod and being parallel to the latter in the middle position of the two rods, and hence eliminating substantially all reaction on the steering wheel, in the vertical displacements of the wheel and cancelling involuntary brakage.

2. A steering mechanism as claimed in claim 1, in which the tubular push or pull rod is of the same length as the steering rod and is parallel to the latter, and in which the arms of each double armed lever are of equal length and of approximately the same length as the pivoting lever of the corresponding wheel arm, and including means for compensating for inequalities in the angular displacements of the lever arm, under the effect of the angular displacements of the double armed lever.

3. A steering mechanism as claimed in claim 1, in which the arms of each double armed lever form an obtuse angle, having its pivoting center placed at a point of the longitudinal axis of the chassis and the extremities of the said arms are nearer the medial transversal line of the chassis than the said pivoting center and the angle of the said lever arms are such as to permit the sides forming prolongations of the axes of each pair of wheels to meet on a line perpendicular to the longitudinal axis of the chassis, said line being preferably the medial transversal line of the chassis.

4. A steering mechanism as claimed in claim 1, in which the arms of each double armed lever form an obtuse angle, having its pivoting center placed at a point of the longitudinal axis of the chassis and the extremities of the said arms are nearer the medial transversal line of the chassis than the said pivoting center and the angle of the said lever arms are such as to permit the sides forming prolongations of the axes of each pair of wheels to meet on a line perpendicular to the longitudinal axis of the chassis, said line being preferably the medial transversal line of the chassis, said double armed levers being symmetrically disposed on opposite sides of the medial transversal line of the chassis, and acting for the simultaneous control of each of the pairs of wheels and including means whereby said double armed levers are turned simultaneously in opposite directions, the points of intersection of the line prolonging the axes of each system of wheels intermingling on a line perpendicular to the longitudinal axis which thus becomes the medial transversal line.

In witness whereof I affix my signature.

ALEXANDER ALBERT HOLLE.